(12) United States Patent
Liu

(10) Patent No.: US 11,025,154 B2
(45) Date of Patent: Jun. 1, 2021

(54) GATE DRIVING CIRCUIT, CHARGE PUMP, AND CHIP WITH SAME

(71) Applicant: FocalTech Electronics (Shenzhen) Co., Ltd., Shenzhen (CN)

(72) Inventor: Jun-Qiao Liu, Guangdong (CN)

(73) Assignee: FocalTech Electronics (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 16/868,951

(22) Filed: May 7, 2020

(65) Prior Publication Data

US 2021/0057982 A1   Feb. 25, 2021

(30) Foreign Application Priority Data

Aug. 22, 2019 (CN) .......................... 201910777564.9

(51) Int. Cl.
  *H02M 1/088*   (2006.01)
  *H02M 1/44*    (2007.01)
  *H02M 3/07*    (2006.01)

(52) U.S. Cl.
  CPC ............. *H02M 1/088* (2013.01); *H02M 1/44* (2013.01); *H02M 3/073* (2013.01); *H02M 2003/075* (2013.01)

(58) Field of Classification Search
  CPC ........ H02M 1/088; H02M 1/44; H02M 3/073; H02M 2003/075
  USPC .................................. 327/108, 109, 110, 111
  See application file for complete search history.

(56) References Cited

U.S. PATENT DOCUMENTS

| | | | | |
|---|---|---|---|---|
| 5,068,626 A | * | 11/1991 | Takagi | H03L 7/107 331/17 |
| 5,144,156 A | * | 9/1992 | Kawasaki | H03L 7/0898 327/157 |
| 5,508,660 A | * | 4/1996 | Gersbach | H03L 7/0895 327/157 |
| 5,801,578 A | * | 9/1998 | Bereza | H03L 7/0896 327/157 |
| 6,124,755 A | * | 9/2000 | Parker | H03L 7/0896 327/112 |
| 2015/0207513 A1 | * | 7/2015 | Tsunoda | G05F 3/26 327/66 |
| 2017/0179848 A1 | | 6/2017 | Shimizu | |
| 2017/0264193 A1 | | 9/2017 | Tsunoda | |

* cited by examiner

*Primary Examiner* — William Hernandez
(74) *Attorney, Agent, or Firm* — ScienBiziP, P.C.

(57) ABSTRACT

A gate driving circuit for a charge pump with slowed rates of current change for reduced EMI emissions includes at least one gate driving sub-circuit. Each gate driving sub-circuit includes a first current mirror, a first PMOS transistor, a first NMOS transistor, and a second current mirror. Gates of the first PMOS transistor and the first NMOS transistor receive a clock signal. Drains of the first PMOS transistor and the first NMOS transistor output a driving signal. When the first PMOS transistor is turned on, the first current mirror provides a charging current. When the first NMOS transistor is turned on, the second current mirror provides a discharge current.

20 Claims, 10 Drawing Sheets

GATE DRIVING CIRCUIT, CHARGE PUMP, AND CHIP WITH SAME

FIELD

The subject matter herein generally relates to analog integrated circuits, and in particular to a gate driving circuit, a charge pump, and a chip having the gate driving circuit.

BACKGROUND

A charge pump is a DC-DC converter widely used in consumer electronics chips. The charge pump is mainly used in situations where an input power needs to be boosted. Taking a charge pump that generates twice the voltage as an example, as shown in FIG. 1, the charge pump includes two portions, that is, a boosting circuit 110 and a gate driving circuit 120. The boosting circuit 110 includes four switching transistors MP1, MP2, MP3, and MN1, a flying capacitor CF, a voltage stabilizing capacitor CL, and an input power source VIN. The gate driving circuit 120 generates a gate driving signal for each switching transistor. Taking a gate driving circuit that generates a driving signal CLK1H_DRV as an example, the gate driving circuit is a CMOS inverter including a PMOS transistor and an NMOS transistor. When an input clock signal CLK1H_IN of the inverter is at a high level, an output of the control signal CLK1H_DRV is a low level (for example, 0V). When the input clock signal CLK1H_IN is at a low level, the output of the control signal CLK1H_DRV is a high level.

Referring to FIG. 2, the above-mentioned charge pump switch control method uses an inverter to directly drive the gate, which causes the switching transistor to turn on or off too fast, resulting in a large peak current. Both the rising and falling edges of the voltage across the flying capacitor are fast, thereby causing two problems:

(1) Flying capacitors are generally integrated inside the IC and are MIM (metal-insulator-metal) capacitors. When the charge pump is operating, a voltage waveform across the flying capacitor (such as an upper plate VT and a lower plate VB) is a square wave signal. If the edge of the voltage waveform is very steep, electromagnetic interference (EMI) in form of electric field coupling is radiated. If the interference is not controlled in mobile electronic devices (such as mobile phones), sensitivity of the antenna to receive signals is affected.

(2) Secondly, if the peak current flowing through the bonding wire sharply changes without proper decoupling, the peak current will flow through the bonding wire as an inductance and will generate magnetic field radiation which also interferes with the antenna.

Therefore, there is room for improvement within the art.

BRIEF DESCRIPTION OF THE DRAWINGS

Many aspects of the disclosure can be better understood with reference to the figure. The components in the figures are not necessarily drawn to scale, the emphasis instead being placed upon clearly illustrating the principles of the disclosure.

DETAILED DESCRIPTION

Figure 1:
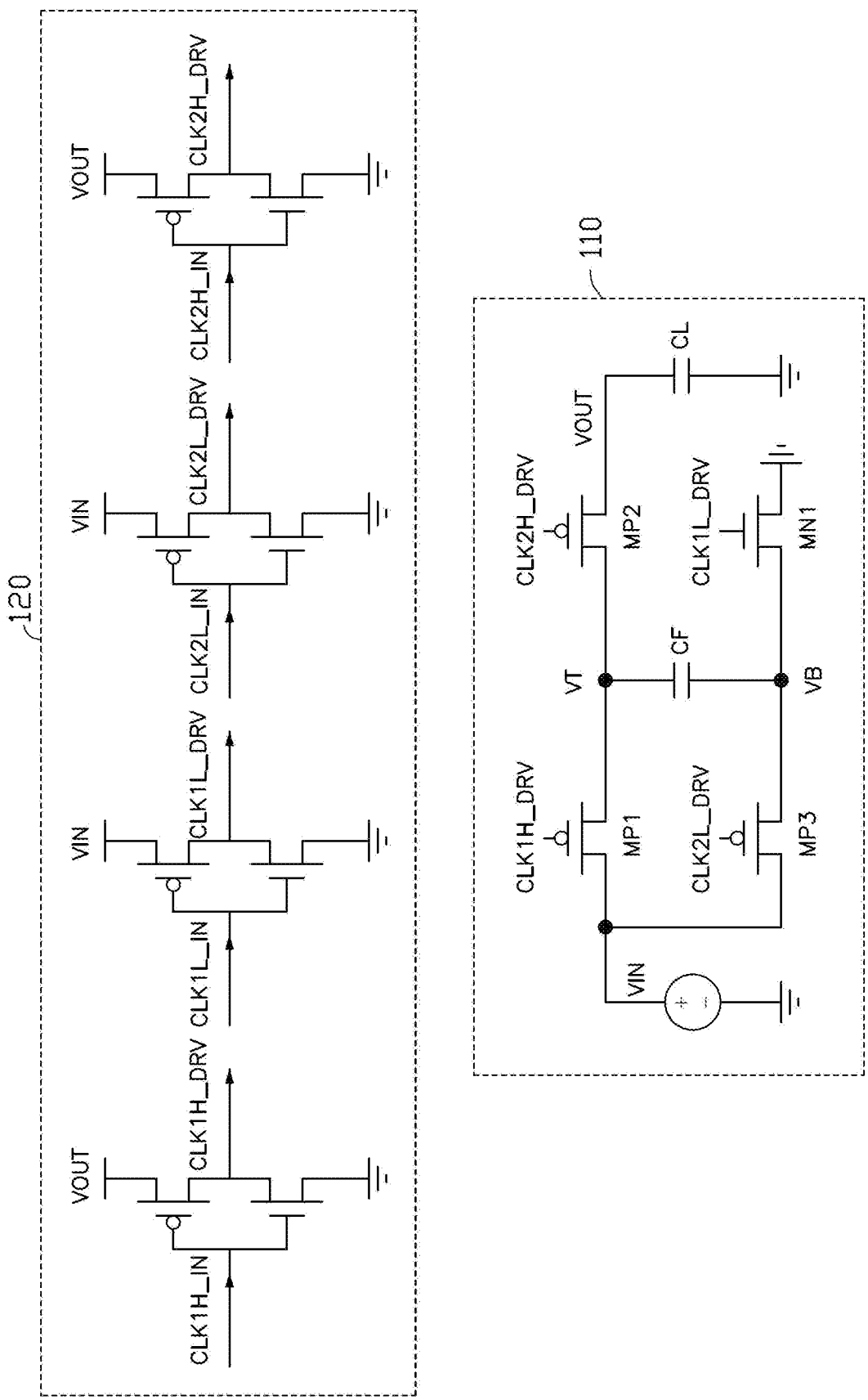
FIG. 1 is a circuit diagram of a charge pump of prior art.
Figure 2:
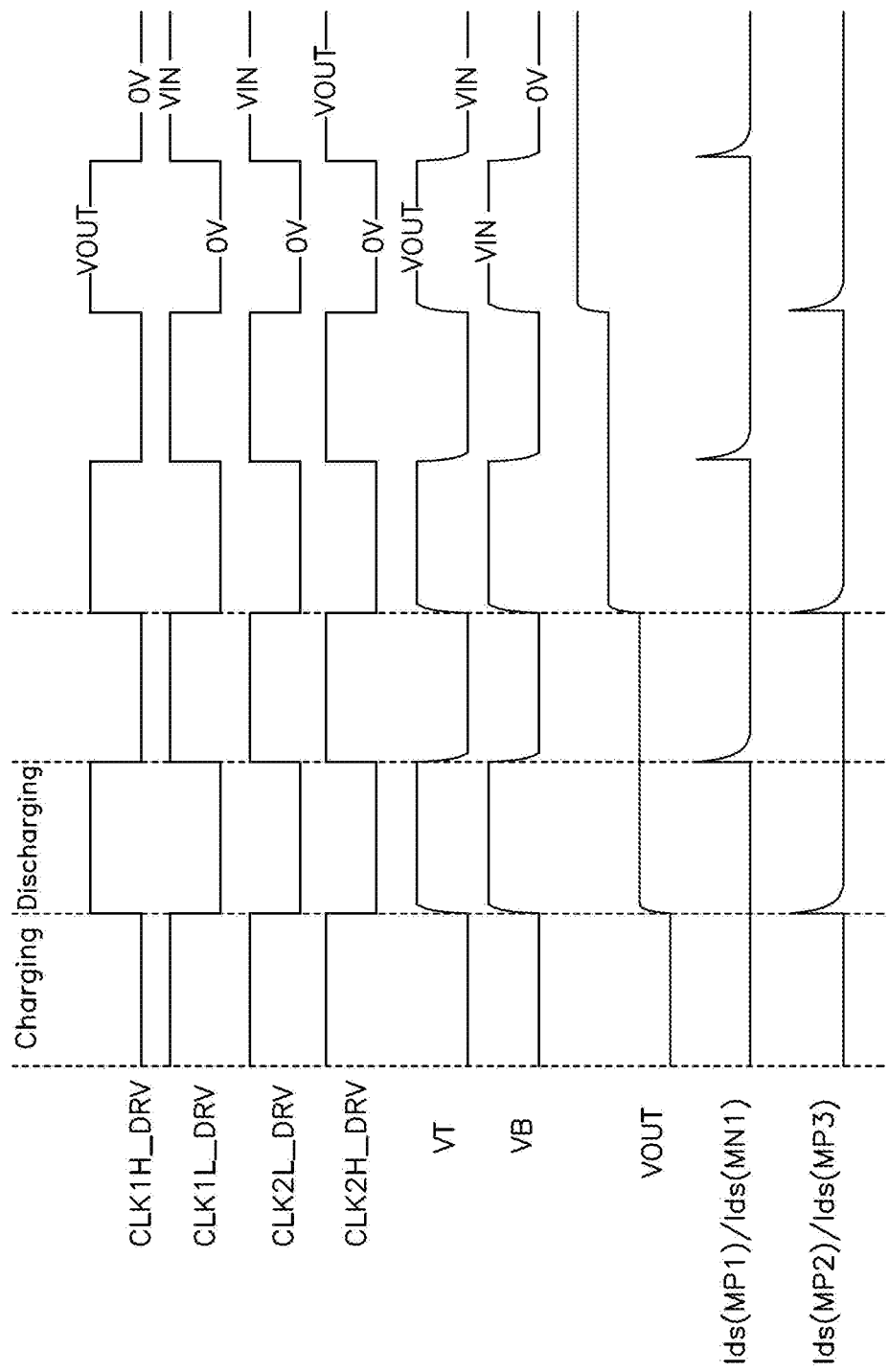
FIG. 2 is a timing diagram of a charge pump of prior art.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 3:
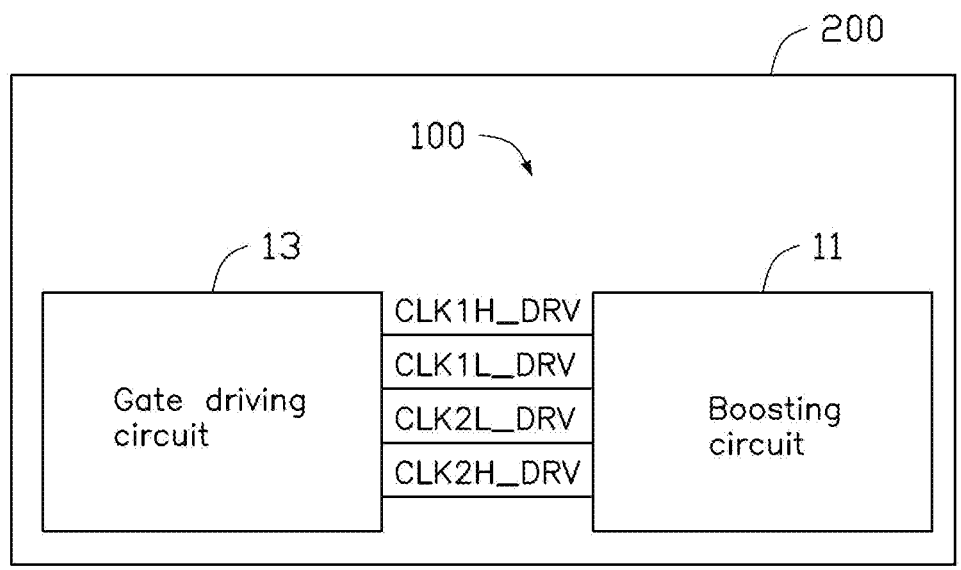
FIG. 3 is a block diagram of a novel charge pump according to an embodiment of the present disclosure.

FIG. 3 illustrates a charge pump 100 of the present disclosure. The charge pump 100 can be installed in a consumer electronic chip 200. The charge pump 100 includes a boosting circuit 11 and a gate driving circuit 13. The boosting circuit 11 includes an input power source VIN (see FIG. 4). The gate driving circuit 13 is electrically connected to the boosting circuit 11 and outputs a gate driving signal to the boosting circuit 11, to control switching transistors in the boosting circuit 11 to turn on or off. A voltage of the input power source VIN is thereby boosted. In this embodiment, the charge pump 100 doubles the voltage of the input power source VIN.

Figure 4:
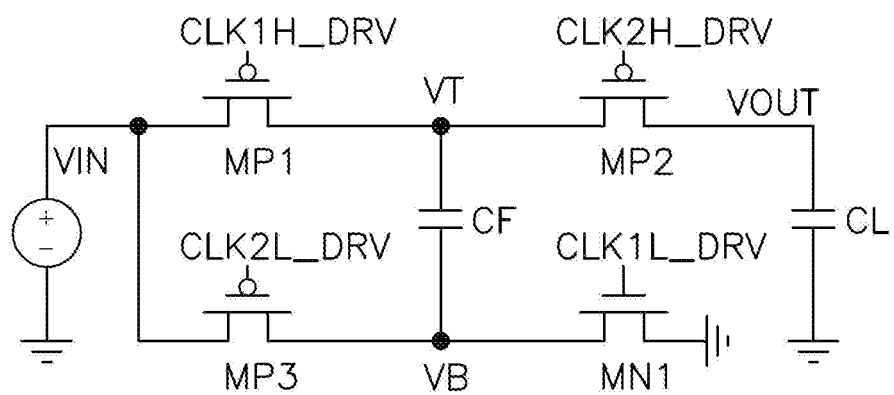
FIG. 4 is a circuit diagram of a boosting circuit of the charge pump of FIG. 3.

As shown in FIG. 4, the boosting circuit 11 includes the input power source VIN, a first switching transistor MP1, a second switching transistor MP2, a third switching transistor MP3, a fourth switching transistor MN1, a first capacitor CF, and a second capacitor CL.

Sources of the first and third switching transistors MP1 and MP3 are connected together and are both electrically connected to one end of the input power source VIN. The other end of the input power source VIN is grounded. A drain of the first switching transistor MP1 and a source of the second switching transistor MP2 are electrically connected together and are both electrically connected to one end of the first capacitor CF, for example, an upper electrode plate VT of the first capacitor CF. A drain of the third switching transistor MP3 and a drain of the fourth switching transistor MN1 are connected together, and are both electrically connected to the other end of the first capacitor CF, for example, to a lower electrode plate VB of the first capacitor CF.

A drain of the second switching transistor MP2 is electrically connected to one end of the second capacitor CL, and serves as an output terminal VOUT of the boosting circuit 11 to output a first voltage. The other end of the second capacitor CL is grounded. A source of the fourth switching transistor MN1 is grounded. Gates of the first to fourth switching transistors MP1-MP3 and MN1 are all electrically connected to the gate driving circuit 13 for receiving gate driving signals, and accordingly turning on or off for boosting the voltage of the input power source VIN.

For example, in this embodiment, the gate of the first switching transistor MP1 receives a first gate driving signal CLK1H_DRV to control the first switching transistor MP1 to be turned on or off. The gate of the second switching transistor MP2 receives a second gate driving signal CLK2H_DRV to control the second switching transistor MP2 to be turned on or off. The gate of the third switching transistor MP3 receives a third gate driving signal CLK2L_DRV to control the third switching transistor MP3 to be turned on or off. The gate of the fourth switching transistor MP4 receives a fourth gate driving signal CLK1L_DRV to control the fourth switching transistor MN1 to be turned on or off.

In this embodiment, the first to third switching transistors MP1 to MP3 are all PMOS transistors. The fourth switching transistor MN1 is an NMOS transistor. When the gate driving signals input to the first to third switching transistors MP1-MP3 are at a low level (for example, 0V), the first to third switching transistors MP1-MP3 are turned on. When the gate driving signals input to the first to third switching transistors MP1-MP3 are at a high level, the first to third switching transistors MP1-MP3 are turned off. When the gate driving signal input to the fourth switching transistor MN1 is at a low level (for example, 0V), the fourth switching transistor MN1 is turned off. When the gate driving signal input to the fourth switching transistor MN1 is at a high level, the fourth switching transistor MN1 is turned on.

In this embodiment, a first voltage value output by the output terminal VOUT of the boosting circuit 11 is about twice a voltage value output by the input power source VIN.

In this embodiment, the first capacitor CF is a flying capacitor. The second capacitor CL is a voltage stabilizing capacitor.

Figure 5:
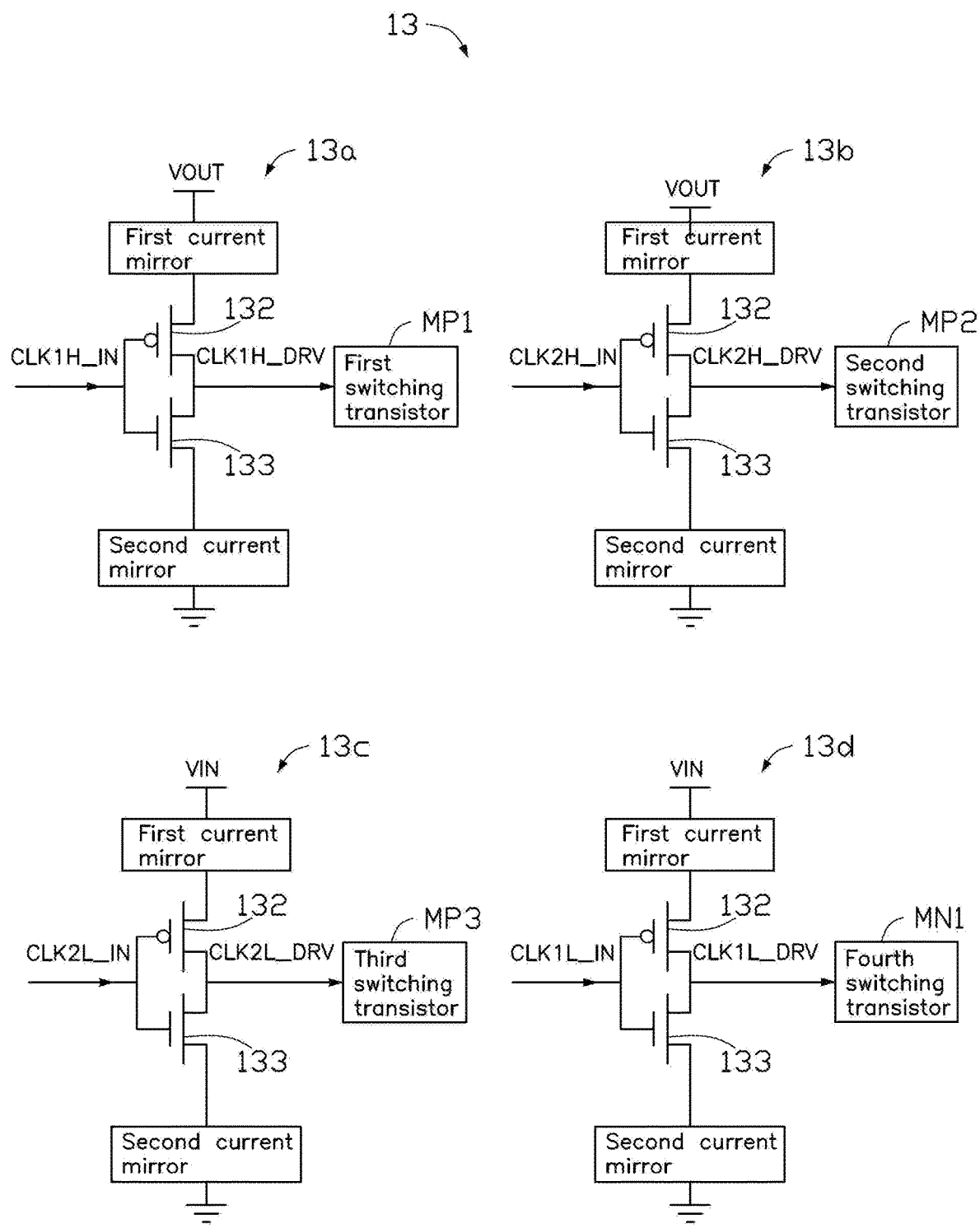
FIG. 5 is a block diagram of a gate driving circuit of the charge pump of FIG. 3.

As shown in FIG. 5, in this embodiment, the gate driving circuit 13 includes a first gate driving sub-circuit 13a, a second gate driving sub-circuit 13b, a third gate driving sub-circuit 13c, and a fourth gate driving sub-circuit 13d. The first to fourth gate driving sub-circuits 13a-13d output gate driving signals to the switching transistors in the boosting circuit 11. For example, the first gate driving sub-circuit 13a outputs the first gate driving signal CLKIH_DRV to the first switching transistor MP1. The second gate driving sub-circuit 13b outputs the second gate driving signal CLK2H_DRV to the second switching transistor MP2. The third gate driving sub-circuit 13c outputs the third gate driving signal CLK2L_DRV to the third switching transistor MP3. The fourth gate driving sub-circuit 13d outputs the fourth gate driving signal CLK1L_DRV to the fourth switch MN1.

The first gate driving sub-circuit 13a includes a first current mirror, a first PMOS transistor 132, a first NMOS transistor 133, and a second current mirror. One end of the first current mirror is electrically connected to a first power source. A source of the first PMOS transistor 132 is electrically connected to the other end of the first current mirror. A gate of the first NMOS transistor 133 and a gate of the first PMOS transistor 132 are electrically connected together, and are both electrically connected to a first clock signal CLK1H_IN. A drain of the first NMOS transistor 133 and a drain of the first PMOS transistor 132 are electrically connected together to output the first gate driving signal CLKIH_DRV to the first switching transistor MP1. A source of the first NMOS transistor 133 is electrically connected to one end of the second current mirror. The other end of the second current mirror is grounded.

In this embodiment, a circuit structure of the second gate driving sub-circuit 13b is similar to that of the first gate driving sub-circuit 13a. That is, the second gate driving sub-circuit 13b includes a first current mirror, a first PMOS transistor 132, a first NMOS transistor 133, and a second current mirror. The second gate driving sub-circuit 13b differs from the first gate driving sub-circuit 13a in that the input clock signal and the output driving signal are different. Specifically, the gate of the first PMOS transistor 132 and the gate of the first NMOS transistor 133 in the second gate driving sub-circuit 13b are both electrically connected to a second clock signal CLK2H_IN, and output the second gate driving signal CLK2H_DRV to the second switching transistor MP2 through the drain of the first PMOS transistor 132 and the drain of the first NMOS transistor 133.

A circuit structure of the third gate driving sub-circuit 13c is similar to that of the first gate driving sub-circuit 13a. That is, the third gate driving sub-circuit 13c includes a first current mirror, a first PMOS transistor 132, a first NMOS transistor 133, and a second current mirror. The third gate driving sub-circuit 13c differs from the first gate driving sub-circuit 13a in that the input clock signal, the output driving signal, and the power source connected, are different. Specifically, one end of the first current mirror in the third gate driving sub-circuit 13c is electrically connected to a second power source. A gate of the first PMOS transistor 132 and a gate of the first NMOS transistor 133 in the third gate driving sub-circuit 13c are electrically connected to a third clock signal CLK2L_IN and output the third gate driving signal CLK2L_DRV to the third switching transistor MP3 through a drain of the first PMOS transistor 132 and a drain of the first NMOS transistor 133.

A circuit structure of the fourth gate driving sub-circuit 13d is similar to that of the first gate driving sub-circuit 13a. That is, the fourth gate driving sub-circuit 13d includes a first current mirror, a first PMOS transistor 132, a first NMOS transistor 133, and a second current mirror. The fourth gate driving sub-circuit 13d differs from the first gate driving sub-circuit 13a in that the input clock signal, the output driving signal, and the power source connected, are different. Specifically, a drain of the first current mirror in the fourth gate driving sub-circuit 13d is electrically connected to the second power source. A gate of the first PMOS transistor 132 and a gate of the first NMOS transistor 133 in the fourth gate driving sub-circuit 13d are electrically connected to a fourth clock signal CLK1L_IN and output the fourth gate driving signal CLK1L_DRV to the fourth switching transistor MN1, through the drain of the first PMOS transistor 132 and the drain of the first NMOS transistor 133.

Figure 6:
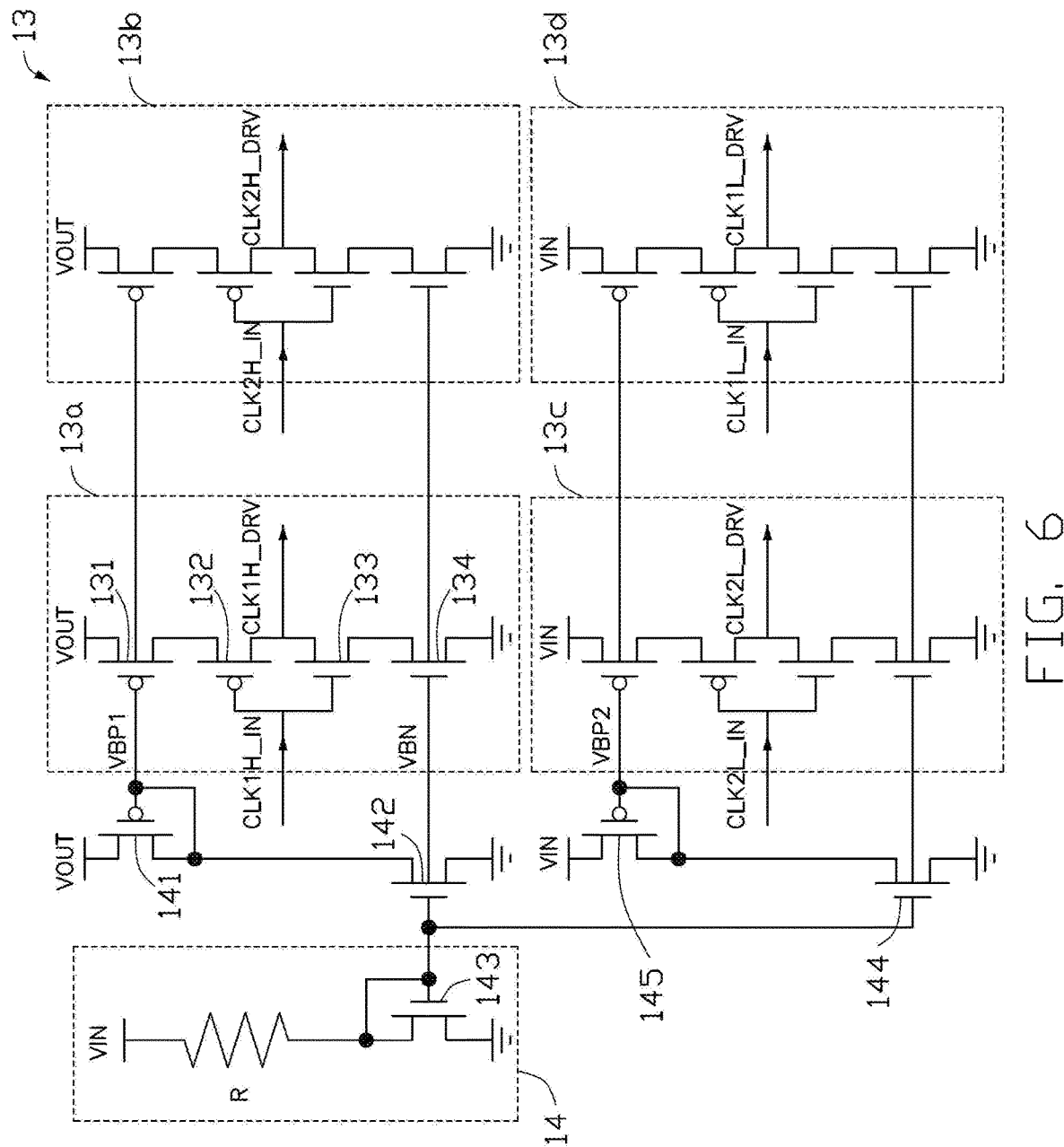
FIG. 6 is a circuit diagram of the gate driving circuit of FIG. 5.

As shown in FIG. 6, the gate driving circuit 13 further includes a bias circuit 14, second PMOS transistors 141 and 145, and second NMOS transistors 142 and 144. In this embodiment, the first current mirror is a PMOS transistor 131. The second current mirror is an NMOS transistor 134. A gate of the PMOS transistor 131 is electrically connected to gates of the second PMOS transistors 141 and 145. A drain of the PMOS transistor 131 is electrically connected to a source of the first PMOS transistor 132. A gate of the NMOS transistor 134 is electrically connected to gates of the second NMOS transistors 142 and 144. A drain of the NMOS transistor 134 is electrically connected to a source of the first NMOS transistor 133. A source of the NMOS transistor 134 is grounded.

Drains of the second PMOS transistors 141 and 145 are electrically connected to gates of the second PMOS transistors 141 and 145. The drains of the second PMOS transistors 141 and 145 output a first bias voltage VBP1 or a second bias voltage VBP2 to the first current mirror (i.e., the PMOS transistor 131). Drains of the second NMOS transistors 142 and 144 are electrically connected to drains of the second PMOS transistors 141 and 145. Sources of the second NMOS transistors 142 and 144 are grounded. The bias circuit 14 is electrically connected to the respective gates of the second NMOS transistors 142 and 144 to provide a bias current for the second NMOS transistors 142 and 144.

In this embodiment, a source of the first current mirror is electrically connected to the first power source or to the second power source. Sources of the second PMOS transistors 141 and 145 are electrically connected to the first power source or to the second power source. For example, the sources of the first current mirrors in the first and second gate driving sub-circuits 13a, 13b are electrically connected to the first power source. The source of the second PMOS transistor 141 is electrically connected to the first power source. The sources of the first current mirrors in the third and fourth gate driving sub-circuits 13c, 13d are electrically connected to the second power source. The source of the second PMOS transistor 145 is electrically connected to the second power source.

In this embodiment, the bias circuit 14 includes a resistor R and a third NMOS transistor 143. One end of the resistor R is electrically connected to the second power source. The other end of the resistor R is electrically connected to the drain of the third NMOS transistor 143. The gate and the drain of the third NMOS transistor 143 are connected together. The source of the third NMOS transistor 143 is grounded. In this embodiment, the second power source generates the bias current through the resistor R and the third NMOS transistor 143 connected in series.

In this embodiment, the second NMOS transistors 142, 144 and the third NMOS transistor 143 form a current mirror. The bias circuit 14, connected through the second PMOS transistors 141, 145 to a diode, generates a first bias voltage VBP1 or a second bias voltage VBP2. The first bias voltage VBP1 or the second bias voltage VBP2 is output to the first current mirror. For example, the bias circuit 14 generates the first bias voltage VBP1 to the first current mirrors in the first and second gate sub-circuits 13a and 13b, through the second PMOS transistor 141. The bias circuit 14 generates the second bias voltage VBP2 through the second PMOS transistor 145 to the first current mirrors in the third and fourth gate sub-circuits 13c and 13d.

In this embodiment, a first voltage output from the output terminal VOUT of the charge pump 100 is about twice the voltage of the input power source VIN. Therefore, the voltage of the input power source VIN of the charge pump 100 and the first voltage can be used as the supply voltages of the gate driving circuit 13. For example, the output terminal VOUT is used as the first power source and the input power source VIN is used as the second power source. That is, the voltage value of the first power source is about twice the voltage value of the second power source.

In this embodiment, the gate driving circuit 13 can be applied to a switch-type charge pump, that is, the charge pump 100 can be a switch-type charge pump.

Figure 7:
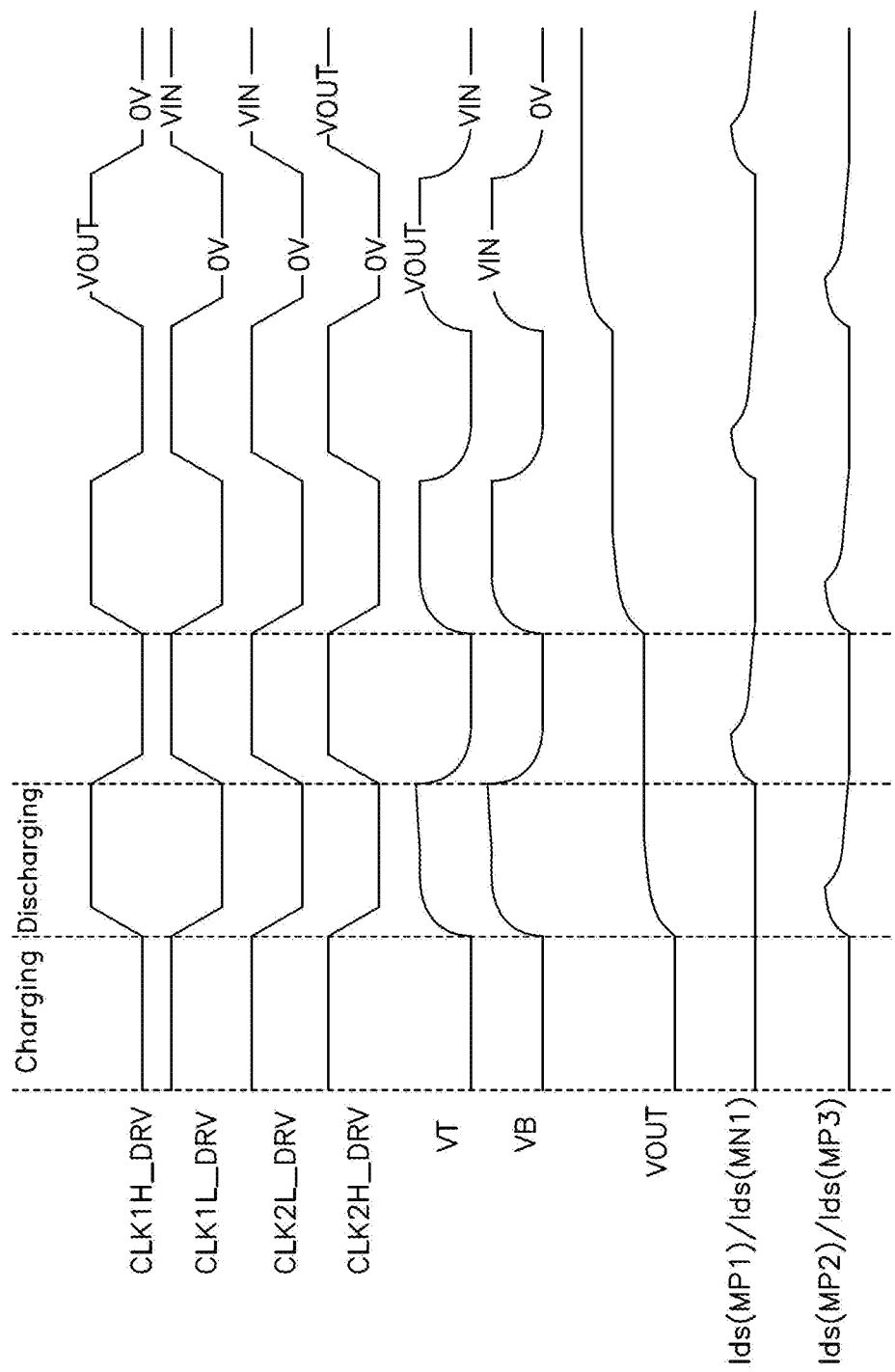
FIG. 7 is a timing diagram of the charge pump of FIG. 3.
Figure 8:
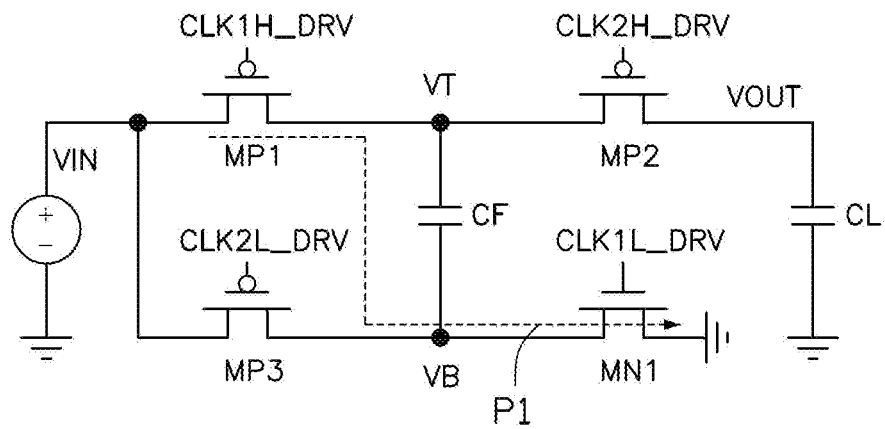
FIG. 8 is a current path diagram, showing the charge pump of FIG. 3 at a charging stage.

FIG. 7 is a timing diagram of the charge pump 100. Under a control of the gate driving signals (for example, CLK1H_DRV, CLK1L_DRV, CLK2L_DRV, and CLK2H_DRV), the charge pump 100 has two working stages, namely, a charging stage and a discharging stage. In the charging stage, the first switching transistor MP1 and the fourth switching transistor MN1 are turned on, the second switching transistor MP2 and the third switching transistor MP3 are turned off, the input power source VIN charges the first capacitor CF, and a charging current path P1 is shown in FIG. 8.

Figure 9:
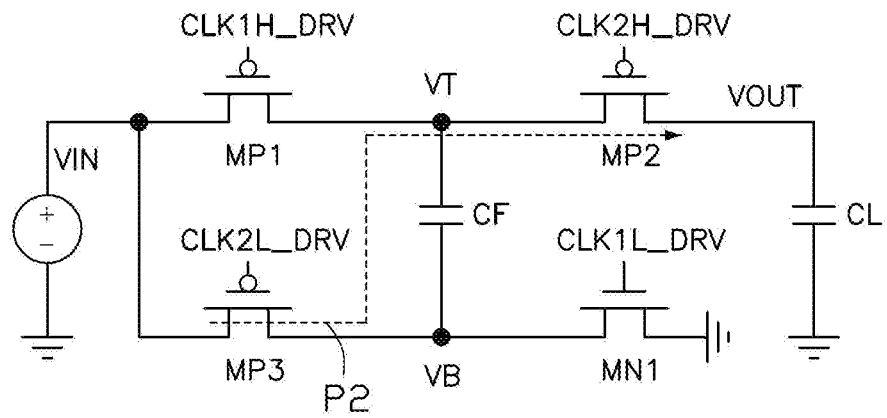
FIG. 9 is a current path diagram, showing the charge pump of FIG. 3 at a discharging stage.

In the discharging stage, the first switching transistor MP1 and the fourth switching transistor MN1 are turned off, and the second switching transistor MP2 and the third switching transistor MP3 are turned on. At this time, the lower electrode plate VB of the first capacitor CF is driven by the input power source VIN, the upper electrode plate VT of the first capacitor CF is discharged to the second capacitor CL, and discharge current path P2 is shown in FIG. 9. In this way, the output voltage of the second capacitor CL (that is, the output voltage of the charge pump 100) will rise in each discharge stage, until the output voltage value is close to twice the voltage value of the input power source VIN.

As shown in FIG. 7, in this embodiment, a working principle of the gate driving circuit 13 is described by taking the first gate driving sub-circuit 13a as an example. When the first clock signal CLK2L_IN is a high level, the first NMOS transistor 133 is turned on, and the second current mirror discharges a parasitic capacitance of the gate of the first switching transistor MP1 with a constant current. That is, when the first NMOS transistor 133 is turned on, the second current mirror provides a discharge current, and then the first gate driving signal CLK1H_DRV is slowly discharged with a first fixed slope.

When the first clock signal CLK2L_IN changes from a high level to a low level, the first PMOS transistor 132 is turned on, and the first current mirror charges the parasitic capacitance of the gate of the first switching transistor MP1 with a constant current. That is, when the first PMOS transistor 132 is turned on, the first current mirror provides a charging current, and then the first gate driving signal CLK1H_DRV is slowly charged with a second fixed slope.

In this way, the gate control signal of the first switching transistor MP1, that is, the rising and falling edges of the first gate driving signal CLK1H_DRV are slowed down, so that opening and closing speeds of the first switching transistor MP1 are correspondingly reduced. Furthermore, a change of a source-drain current Ids of the first switching transistor MP1 is also slowed down, a peak current decrease accordingly. Rising and falling edges of the voltage on the upper and lower plates VT/VB of the first capacitor CF are also slowed down, effectively reducing electromagnetic interference (EMI) radiation of the charge pump 100.

Figure 10:
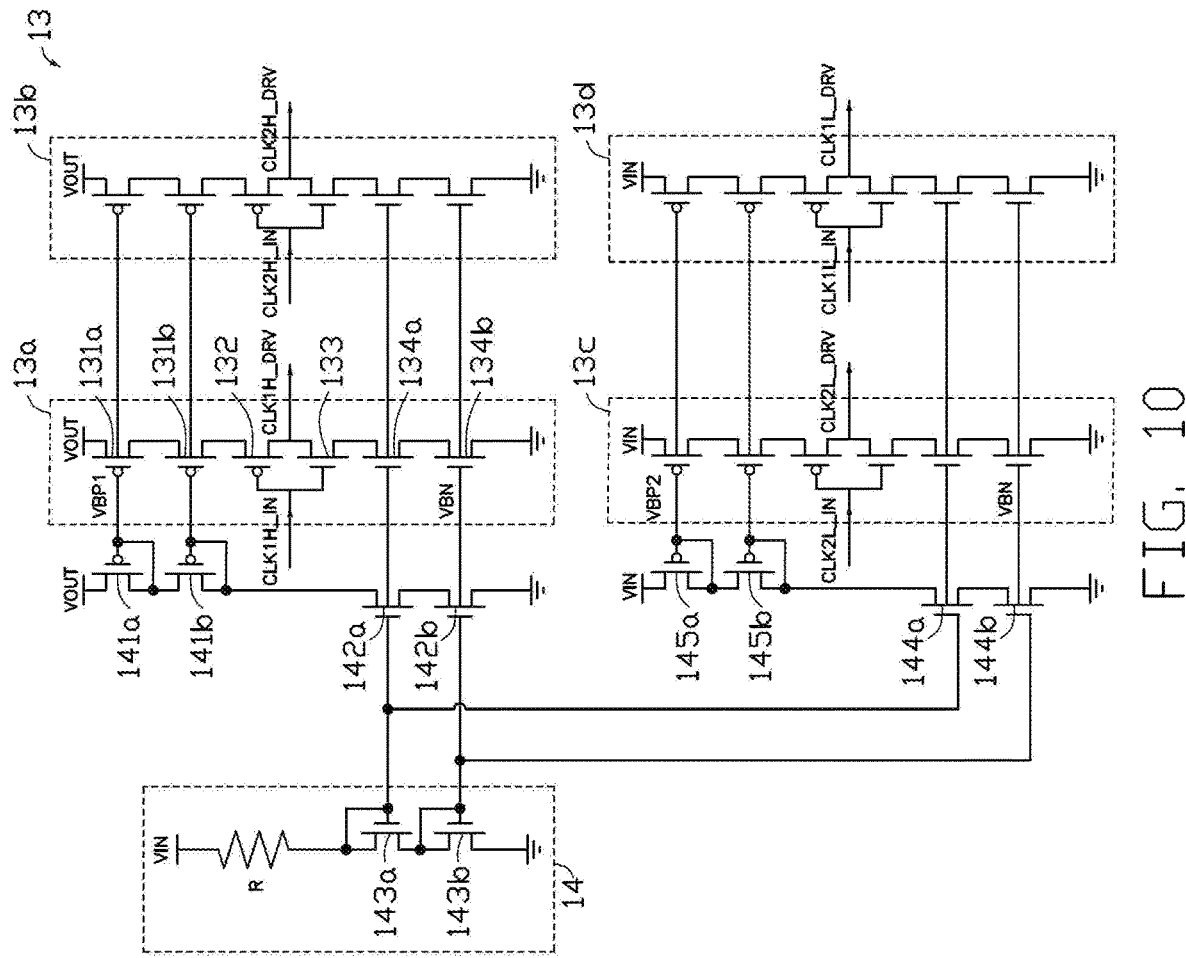
FIG. 10 is a circuit diagram of a gate driving circuit according to another embodiment of the present disclosure.

In other embodiments, number of the PMOS transistors in the first current mirror is not limited to one. Number of the NMOS transistors in the second current mirror is not limited to one. For example, as shown in FIG. 10, the first current mirror may be two PMOS transistors connected in series, such as PMOS transistors 131a and 131b. The second current mirror may be two NMOS transistors connected in series, such as PMOS transistors 134a and 134b. Correspondingly, number of the second PMOS transistors in the gate driving circuit 13, number of the second NMOS transistors, and number of the third NMOS transistors in the bias circuit 14 can also change according to the number of PMOS transistors in the first current mirror and the number of NMOS transistors in the second current mirror.

For example, the two PMOS transistors 131a and 131b connected in series correspond to two second PMOS transistors 141a and 141b or 145a and 145b connected in series. The two NMOS transistors 134a and 134b connected in series correspond to two second NMOS transistors 142a and 142b or to 144a and 144b connected in series. The two PMOS transistors 131a and 131b connected in series and the two NMOS transistors 134a and 134b connected in series also correspond to two third NMOS transistors 143a and 143b connected in series.

In this embodiment, a circuit structure shown in FIG. 10 is similar to the circuit structure shown in FIG. 6. The circuit structure shown in FIG. 10 differs from the circuit structure shown in FIG. 6 in that the number of the PMOS transistors in the first current mirror, the number of the NMOS transistors in the second current mirror, the number of the second PMOS transistors, the number of the second NMOS transistors, and the number of the third NMOS transistors are different, it is not repeated here.

In the above embodiments, when the first power source or the second power source is sufficient to drive two PMOS transistors or two NMOS transistors, the current when the first current mirror includes two PMOS transistors connected in series is more stable than the current when the first current mirror includes only one PMOS. Similarly, the current when the second current mirror includes two NMOS transistors connected in series is more stable than the current when the second current mirror includes only one NMOS transistor.

The gate driving circuit 13 provides charging current and discharging current by setting the first current mirror and the second current mirror, thereby reducing the opening and closing speeds of the switching transistors in the charge pump 100 accordingly. Change of source-drain current of the switching transistors is slower, thereby effectively reducing the EMI of the charge pump 100. That is, the circuit structure of the charge pump 100 provided by the present disclosure is simple and has a reduced and low EMI radiation.

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. A gate driving circuit applied to a charge pump, the gate driving circuit comprising:
   at least one gate driving sub-circuit, each gate driving sub-circuit comprising:
      a first current mirror, one end of the first current mirror electrically connected to one of a first power source and a second power source;
      a first PMOS transistor, a source of the first PMOS transistor electrically connected to the other end of the first current mirror;
      a first NMOS transistor, a gate of the first NMOS transistor electrically connected to a gate of the first PMOS transistor, and a drain of the first NMOS transistor electrically connected to a drain of the first PMOS transistor; and
      a second current mirror, one end of the second current mirror electrically connected to a source of the first NMOS transistor, and the other end of the second current mirror being grounded;
   wherein the gates of the first PMOS transistor and the first NMOS transistor receive a clock signal, and the drains of the first PMOS transistor and the first NMOS transistor output a driving signal; and
   wherein the first current mirror provides a charging current when the first PMOS transistor is turned on, and the second current mirror provides a discharge current when the first NMOS transistor is turned on.

2. The gate driving circuit of claim 1, wherein the first current mirror is a PMOS transistor or two PMOS transistors connected in series, the second current mirror is a NMOS transistor or two NMOS transistors connected in series.

3. The gate driving circuit of claim 2, wherein when the first current mirror is a PMOS transistor and the second current mirror is an NMOS transistor, the gate driving circuit further comprises a bias circuit, a second PMOS transistor, and a second NMOS transistor;
   wherein a gate of the first current mirror is electrically connected to a gate of the second PMOS transistor, a source of the first current mirror is electrically connected to one of the first and second power sources, and a drain of the first current mirror is electrically connected to the source of the first PMOS transistor;
   wherein a gate of the second current mirror is electrically connected to a gate of the second NMOS transistor, a drain of the second current mirror is electrically connected to the source of the first NMOS transistor, a source of the second current mirror is grounded;
   wherein a source of the second PMOS transistor is electrically connected to one of the first and second power sources, a drain of the second PMOS transistor is electrically connected to the gate of the second PMOS transistor and outputs one of a first bias voltage and a second bias voltage to the first current mirror, a drain of the second NMOS transistor is electrically connected to the drain of the second PMOS transistor, a source of the second NMOS transistor is grounded;
   wherein the bias circuit comprises a resistor and a third NMOS transistor, one end of the resistor is electrically connected to the second power source, the other end of the resistor is electrically connected to a drain of the third NMOS transistor, a gate of the third NMOS transistor is electrically connected to the drain of the third NMOS transistor, a source of the third NMOS transistor is grounded; and
   wherein the gate of the third NMOS transistor is also electrically connected to the gate of the second NMOS transistor to provide a bias current for the second NMOS transistor.

4. The gate driving circuit of claim 2, wherein when the first current mirror is two PMOS transistors connected in series and the second current mirror is two NMOS transistors connected in series, the gate driving circuit further comprises a bias circuit, two second PMOS transistors, and two second NMOS transistors;
   wherein a source of one PMOS transistor of the two PMOS transistors connected in series is electrically connected to one of the first and second power sources, a drain of the one PMOS transistor is electrically connected to a source of the other PMOS transistor of the two PMOS transistors connected in series, a drain of the other PMOS transistor is electrically connected to the source of the first PMOS transistor, a drain of one NMOS transistor of the two NMOS transistors connected in series is electrically connected to the source of the first NMOS transistor, a source of the one NMOS transistor is electrically connected to a drain of the other NMOS transistor of the two NMOS transistors connected in series, and a source of the other NMOS transistor is grounded;

wherein the two second PMOS transistors are connected in series, a gate and a drain of one second PMOS transistor of the two second PMOS transistors are connected together and are both electrically connected a gate of the one PMOS transistor, a source of the one second PMOS transistor is electrically connected to one of the first and second power sources, a drain of the one second PMOS transistor is electrically connected to a source of the other second PMOS transistor of the two second PMOS transistors, a gate and a drain of the other second PMOS transistor are electrically connected together and are electrically connected to a gate of the other PMOS transistor;

wherein the two second NMOS transistors are connected in series, a drain of one second NMOS transistor of the two second NMOS transistors is electrically connected to the drain of the other second PMOS transistor, a source of the one second NMOS transistor is electrically connected to a drain of the other second NMOS transistor of the two second NMOS transistors, a source of the other second NMOS transistor is grounded;

wherein the bias circuit comprises a resistor and two third NMOS transistors, one end of the resistor is electrically connected to the second power source, the other end of the resistor is electrically connected to a drain of one third NMOS transistor of the two third NMOS transistors, a gate and the drain of the one third NMOS transistors are electrically connected together and are electrically connected to a gate of the one second NMOS transistor for providing a bias current to one second NMOS transistor; and wherein a source of the one third NMOS transistor is electrically connected to a drain and a gate of the other third NMOS transistor of the two third NMOS transistors, a source of the other third NMOS transistor is grounded, the gate of the other third NMOS transistor is also electrically connected to a gate of the other second NMOS transistor for providing a bias current to the other second NMOS transistor.

5. The gate driving circuit of claim 1, wherein the first power source is an output terminal of the charge pump, and the second power source is an input power source of the charge pump.

6. A charge pump comprising:
a boosting circuit; and
a gate driving circuit electrically connected to the boosting circuit and comprising:
at least one gate driving sub-circuit, each gate driving sub-circuit comprising:
a first current mirror, one end of the first current mirror electrically connected to one of a first power source and a second power source;
a first PMOS transistor, a source of the first PMOS transistor electrically connected to the other end of the first current mirror;
a first NMOS transistor, a gate of the first NMOS transistor electrically connected to a gate of the first PMOS transistor, and a drain of the first NMOS transistor electrically connected to a drain of the first PMOS transistor; and
a second current mirror, one end of the second current mirror electrically connected to a source of the first NMOS transistor, and the other end of the second current mirror being grounded;

wherein the gates of the first PMOS transistor and the first NMOS transistor receive a clock signal, and the drains of the first PMOS transistor and the first NMOS transistor output a driving signal to the boosting circuit; and wherein the first current mirror provides a charging current when the first PMOS transistor is turned on, and the second current mirror provides a discharge current when the first NMOS transistor is turned on.

7. The charge pump of claim 6, wherein the boosting circuit comprises an input power source, a first switching transistor, a second switching transistor, a third switching transistor, a fourth switching transistor, a first capacitor, and a second capacitor;

wherein sources of the first and third switching transistors are connected together and are electrically connected to one end of the input power source, the other end of the input power source is grounded, a drain of the first switching transistor is electrically connected to a source of the second switching transistor and one end of the first capacitor, a drain of the third switching transistor is electrically connected to a drain of the fourth switching transistor and the other end of the first capacitor;

wherein a drain of the second switching transistor is electrically connected to one end of the second capacitor and is used as an output terminal of the boosting circuit to output a first voltage, the other end of the second capacitor is grounded, a source of the fourth switching transistor is grounded; and wherein gates of the first to fourth switching transistors are electrically connected to the drain of the first PMOS transistor and the drain of the first NMOS transistor of the gate driving circuit for receiving the driving signal.

8. The charge pump of claim 7, wherein the first capacitor is a flying capacitor, the second capacitor is a stabilizing capacitor.

9. The charge pump of claim 7, wherein the first switching transistor, the second switching transistor, and the third switching transistor are all PMOS transistors, the fourth switching transistor is an NMOS transistor.

10. The charge pump of claim 7, wherein the first power source is the output terminal, and the second power source is the input power source.

11. The charge pump of claim 6, wherein the first current mirror is a PMOS transistor or two PMOS transistors connected in series, the second current mirror is a NMOS transistor or two NMOS transistors connected in series.

12. The charge pump of claim 11, wherein when the first current mirror is a PMOS transistor and the second current mirror is an NMOS transistor, the gate driving circuit further comprises a bias circuit, a second PMOS transistor, and a second NMOS transistor;

wherein a gate of the first current mirror is electrically connected to a gate of the second PMOS transistor, a source of the first current mirror is electrically connected to one of the first and second power sources, and a drain of the first current mirror is electrically connected to the source of the first PMOS transistor;

wherein a gate of the second current mirror is electrically connected to a gate of the second NMOS transistor, a drain of the second current mirror is electrically connected to the source of the first NMOS transistor, a source of the second current mirror is grounded;

wherein a source of the second PMOS transistor is electrically connected to one of the first and second power sources, a drain of the second PMOS transistor is electrically connected to the gate of the second PMOS transistor and outputs one of a first bias voltage and a second bias voltage to the first current mirror, a drain of the second NMOS transistor is electrically connected to the drain of the second PMOS transistor, a source of the second NMOS transistor is grounded;

wherein the bias circuit comprises a resistor and a third NMOS transistor, one end of the resistor is electrically connected to the second power source, the other end of the resistor is electrically connected to a drain of the third NMOS transistor, a gate of the third NMOS transistor is electrically connected to the drain of the third NMOS transistor, a source of the third NMOS transistor is grounded; and wherein the gate of the third NMOS transistor is also electrically connected to the gate of the second NMOS transistor to provide a bias current for the second NMOS transistor.

13. The charge pump of claim 11, wherein when the first current mirror is two PMOS transistors connected in series and the second current mirror is two NMOS transistors connected in series, the gate driving circuit further comprises a bias circuit, two second PMOS transistors, and two second NMOS transistors;

wherein a source of one PMOS transistor of the two PMOS transistors connected in series is electrically connected to one of the first and second power sources, a drain of the one PMOS transistor is electrically connected to a source of the other PMOS transistor of the two PMOS transistors connected in series, a drain of the other PMOS transistor is electrically connected to the source of the first PMOS transistor, a drain of one NMOS transistor of the two NMOS transistors connected in series is electrically connected to the source of the first NMOS transistor, a source of the one NMOS transistor is electrically connected to a drain of the other NMOS transistor of the two NMOS transistors connected in series, and a source of the other NMOS transistor is grounded;

wherein the two second PMOS transistors are connected in series, a gate and a drain of one second PMOS transistor of the two second PMOS transistors are connected together and are both electrically connected a gate of the one PMOS transistor, a source of the one second PMOS transistor is electrically connected to one of the first and second power sources, a drain of the one second PMOS transistor is electrically connected to a source of the other second PMOS transistor of the two second PMOS transistors, a gate and a drain of the other second PMOS transistor are electrically connected together and are electrically connected to a gate of the other PMOS transistor;

wherein the two second NMOS transistors are connected in series, a drain of one second NMOS transistor of the two second NMOS transistors is electrically connected to the drain of the other second PMOS transistor, a source of the one second NMOS transistor is electrically connected to a drain of the other second NMOS transistor of the two second NMOS transistors, a source of the other second NMOS transistor is grounded;

wherein the bias circuit comprises a resistor and two third NMOS transistors, one end of the resistor is electrically connected to the second power source, the other end of the resistor is electrically connected to a drain of one third NMOS transistor of the two third NMOS transistors, a gate and the drain of the one third NMOS transistors are electrically connected together and are electrically connected to a gate of the one second NMOS transistor for providing a bias current to one second NMOS transistor; and wherein a source of the one third NMOS transistor is electrically connected to a drain and a gate of the other third NMOS transistor of the two third NMOS transistors, a source of the other third NMOS transistor is grounded, the gate of the other third NMOS transistor is also electrically connected to a gate of the other second NMOS transistor for providing a bias current to the other second NMOS transistor.

14. A chip comprising:
a charge pump comprising:
a boosting circuit; and
a gate driving circuit electrically connected to the boosting circuit and comprising:
at least one gate driving sub-circuit, each gate driving sub-circuit comprising:
a first current mirror, one end of the first current mirror electrically connected to one of a first power source and a second power source;
a first PMOS transistor, a source of the first PMOS transistor electrically connected to the other end of the first current mirror;
a first NMOS transistor, a gate of the first NMOS transistor electrically connected to a gate of the first PMOS transistor, and a drain of the first NMOS transistor electrically connected to a drain of the first PMOS transistor; and
a second current mirror, one end of the second current mirror electrically connected to a source of the first NMOS transistor, and the other end of the second current mirror being grounded;
wherein the gates of the first PMOS transistor and the first NMOS transistor receive a clock signal, and the drains of the first PMOS transistor and the first NMOS transistor output a driving signal to the boosting circuit; and
wherein the first current mirror provides a charging current when the first PMOS transistor is turned on, and the second current mirror provides a discharge current when the first NMOS transistor is turned on.

15. The chip of claim 14, wherein the boosting circuit comprises an input power source, a first switching transistor, a second switching transistor, a third switching transistor, a fourth switching transistor, a first capacitor, and a second capacitor;

wherein sources of the first and third switching transistors are connected together and are electrically connected to one end of the input power source, the other end of the input power source is grounded, a drain of the first switching transistor is electrically connected to a source of the second switching transistor and one end of the first capacitor, a drain of the third switching transistor is electrically connected to a drain of the fourth switching transistor and the other end of the first capacitor;

wherein a drain of the second switching transistor is electrically connected to one end of the second capacitor and is used as an output terminal of the boosting circuit to output a first voltage, the other end of the second capacitor is grounded, a source of the fourth switching transistor is grounded; and wherein gates of the first to fourth switching transistors are electrically connected to the drain of the first PMOS transistor and the drain of the first NMOS transistor of the gate driving circuit for receiving the driving signal.

16. The chip of claim 15, wherein the first capacitor is a flying capacitor, the second capacitor is a stabilizing capacitor.

17. The chip of claim 15, wherein the first switching transistor, the second switching transistor, and the third switching transistor are all PMOS transistors, the fourth switching transistor is an NMOS transistor.

18. The chip of claim 14, wherein the first current mirror is a PMOS transistor or two PMOS transistors connected in series, the second current mirror is a NMOS transistor or two NMOS transistors connected in series.

19. The chip of claim 18, wherein when the first current mirror is a PMOS transistor and the second current mirror is an NMOS transistor, the gate driving circuit further comprises a bias circuit, a second PMOS transistor, and a second NMOS transistor;
    wherein a gate of the first current mirror is electrically connected to a gate of the second PMOS transistor, a source of the first current mirror is electrically connected to one of the first and second power sources, and a drain of the first current mirror is electrically connected to the source of the first PMOS transistor;
    wherein a gate of the second current mirror is electrically connected to a gate of the second NMOS transistor, a drain of the second current mirror is electrically connected to the source of the first NMOS transistor, a source of the second current mirror is grounded;
    wherein a source of the second PMOS transistor is electrically connected to one of the first and second power sources, a drain of the second PMOS transistor is electrically connected to the gate of the second PMOS transistor and outputs one of a first bias voltage and a second bias voltage to the first current mirror, a drain of the second NMOS transistor is electrically connected to the drain of the second PMOS transistor, a source of the second NMOS transistor is grounded;
    wherein the bias circuit comprises a resistor and a third NMOS transistor, one end of the resistor is electrically connected to the second power source, the other end of the resistor is electrically connected to a drain of the third NMOS transistor, a gate of the third NMOS transistor is electrically connected to the drain of the third NMOS transistor, a source of the third NMOS transistor is grounded; and
    wherein the gate of the third NMOS transistor is also electrically connected to the gate of the second NMOS transistor to provide a bias current for the second NMOS transistor.

20. The chip of claim 18, wherein when the first current mirror is two PMOS transistors connected in series and the second current mirror is two NMOS transistors connected in series, the gate driving circuit further comprises a bias circuit, two second PMOS transistors, and two second NMOS transistors;
    wherein a source of one PMOS transistor of the two PMOS transistors connected in series is electrically connected to one of the first and second power sources, a drain of the one PMOS transistor is electrically connected to a source of the other PMOS transistor of the two PMOS transistors connected in series, a drain of the other PMOS transistor is electrically connected to the source of the first PMOS transistor, a drain of one NMOS transistor of the two NMOS transistors connected in series is electrically connected to the source of the first NMOS transistor, a source of the one NMOS transistor is electrically connected to a drain of the other NMOS transistor of the two NMOS transistors connected in series, and a source of the other NMOS transistor is grounded;
    wherein the two second PMOS transistors are connected in series, a gate and a drain of one second PMOS transistor of the two second PMOS transistors are connected together and are both electrically connected a gate of the one PMOS transistor, a source of the one second PMOS transistor is electrically connected to one of the first and second power sources, a drain of the one second PMOS transistor is electrically connected to a source of the other second PMOS transistor of the two second PMOS transistors, a gate and a drain of the other second PMOS transistor are electrically connected together and are electrically connected to a gate of the other PMOS transistor;
    wherein the two second NMOS transistors are connected in series, a drain of one second NMOS transistor of the two second NMOS transistors is electrically connected to the drain of the other second PMOS transistor, a source of the one second NMOS transistor is electrically connected to a drain of the other second NMOS transistor of the two second NMOS transistors, a source of the other second NMOS transistor is grounded;
    wherein the bias circuit comprises a resistor and two third NMOS transistors, one end of the resistor is electrically connected to the second power source, the other end of the resistor is electrically connected to a drain of one third NMOS transistor of the two third NMOS transistors, a gate and the drain of the one third NMOS transistors are electrically connected together and are electrically connected to a gate of the one second NMOS transistor for providing a bias current to one second NMOS transistor; and
    wherein a source of the one third NMOS transistor is electrically connected to a drain and a gate of the other third NMOS transistor of the two third NMOS transistors, a source of the other third NMOS transistor is grounded, the gate of the other third NMOS transistor is also electrically connected to a gate of the other second NMOS transistor for providing a bias current to the other second NMOS transistor.

* * * * *